US009626326B2

(12) United States Patent
Chen et al.

(10) Patent No.: US 9,626,326 B2
(45) Date of Patent: Apr. 18, 2017

(54) DATA STORAGE EXPANDING APPARATUS

(71) Applicant: Super Micro Computer Inc., San Jose, CA (US)

(72) Inventors: Richard S. Chen, San Jose, CA (US); Lawrence H. Liang, San Jose, CA (US); Lawrence K. W. Lam, San Jose, CA (US); Shen Ping, San Jose, CA (US)

(73) Assignee: Super Micro Computer Inc., San Jose, CA (US)

( * ) Notice: Subject to any disclaimer, the term of this patent is extended or adjusted under 35 U.S.C. 154(b) by 331 days.

(21) Appl. No.: 14/470,684

(22) Filed: Aug. 27, 2014

(65) Prior Publication Data

US 2015/0113188 A1 Apr. 23, 2015

(30) Foreign Application Priority Data

Oct. 18, 2013 (TW) ............................ 102137839 A

(51) Int. Cl.

*G06F 13/12* (2006.01)
*G06F 13/38* (2006.01)
*G06F 13/00* (2006.01)
*G06F 12/00* (2006.01)
*G06F 13/28* (2006.01)

(Continued)

(52) U.S. Cl.

CPC ........ *G06F 13/4068* (2013.01); *G06F 3/0607* (2013.01); *G06F 3/0626* (2013.01); *G06F 3/0631* (2013.01); *G06F 3/0689* (2013.01); *G06F 13/364* (2013.01); *G06F 2213/0008* (2013.01); *G06F 2213/0052* (2013.01); *G06F 2213/40* (2013.01)

(58) Field of Classification Search

CPC ...... G06F 3/0658; G06F 3/0689; G06F 3/061; G06F 3/0656; G06F 3/0683
USPC ............ 710/74, 110, 300, 316; 711/112, 114
See application file for complete search history.

(56) References Cited

U.S. PATENT DOCUMENTS 6,804,739 B1 * 10/2004 Young .................. G06F 13/405 370/230
8,806,123 B1 * 8/2014 Kennedy .............. G06F 3/0689 711/112

(Continued)

*Primary Examiner* — Faisal M Zaman
(74) *Attorney, Agent, or Firm* — Muncy, Geissler, Olds & Lowe, P.C.

(57) ABSTRACT

A data storage expanding apparatus is electrically coupled to a terminal equipment and multiple data storage groups. Each data storage group includes a plurality of data storage devices. The data storage expanding apparatus configured to transmit an operating data between the terminal equipment and to a particular data storage device. The data storage expanding apparatus includes a data storage expanding module and multiple signal expanding modules. The data storage expanding module is electrically coupled to the terminal equipment. The signal expanding modules are electrically coupled in series, and to the data storage groups, respectively. One of the signal expanding modules is electrically coupled to the data storage expanding module. The operating data signal is transmitted to the signal expanding module via the data storage expanding module electrically connected to the signal expanding module, and then transmitted to particular data storage device via the signal expanding module.

8 Claims, 3 Drawing Sheets

50
32 30 32 30 32 30 32 30
data storage device
slave signal expanding component
master signal expanding component
440 442 44 42 40 20
data storage module
terminal equipment

(51) Int. Cl.
*G06F 13/40* (2006.01)
*G06F 13/364* (2006.01)
*G06F 3/06* (2006.01)

(56) References Cited

U.S. PATENT DOCUMENTS

| | | | | |
|---|---|---|---|---|
| 2003/0188063 | A1* | 10/2003 | Thiesfeld | G06F 13/372 710/119 |
| 2008/0082706 | A1* | 4/2008 | Buckland | G06F 13/4022 710/104 |
| 2008/0091810 | A1* | 4/2008 | Blinick | H04L 49/10 709/223 |
| 2008/0155133 | A1* | 6/2008 | Honjo | G06F 11/3485 710/19 |
| 2008/0307161 | A1* | 12/2008 | Wei | G06F 3/0617 711/114 |
| 2009/0271556 | A1* | 10/2009 | Rutherford, III | G06F 13/4022 710/313 |
| 2011/0320706 | A1* | 12/2011 | Nakajima | G06F 11/0793 711/114 |
| 2013/0166788 | A1* | 6/2013 | Katano | G06F 3/061 710/15 |
| 2013/0191576 | A1* | 7/2013 | Chiang | G06F 8/665 710/305 |
| 2013/0275648 | A1* | 10/2013 | Hameed | G06F 13/4022 710/316 |
| 2014/0143447 | A1* | 5/2014 | Wu | G06F 3/0685 710/3 |
| 2014/0229757 | A1* | 8/2014 | Danayakanakeri | G06F 11/2038 714/4.11 |

* cited by examiner

DATA STORAGE EXPANDING APPARATUS

BACKGROUND OF THE INVENTION

Field of the Invention

The present invention relates to hardware expanding device, and in particular to a data storage expanding apparatus in a server or computer system.

Description of Related Art

Reference is made to FIG. 1, which is a block diagram of a conventional data storage expanding apparatus. The data storage expanding apparatus 10 is electrically connected to and between a terminal equipment 20 (e.g. a server or computer system) and a plurality of data storage groups 30. The data storage groups 30 include a plurality of data storage devices 32 electrically connected in series. The data storage expanding apparatus 10 is configured to transmit an operation/data signal back and forth from the terminal equipment 20 to at least one data storage device 32 of the data storage group 30 electrically connected thereto. The data storage expanding apparatus 10 includes a data storage expanding module 12 and a signal expanding component 14. The data storage expanding module 12 is electrically connected to the terminal equipment 20 and the signal expanding component 14. The signal expanding component 14 is electrically connected to the data storage groups 30 such that the operating/data signal back and forth from the terminal equipment 20 can be transmitted to at least one data storage device 32 via the data storage expanding module 12 and the signal expanding component 14.

As known in the skilled of the art, the data storage expanding module 12 can be implemented by a host controller, host adapter, or host bus adapter (HBA) for the purpose of connecting a host system (e.g. the terminal equipment 20) to other storage devices (i.e. data storage devices 32 or data storage group 30). The terms "data storage expanding module 12" herein are primarily used to refer to devices for connecting SCSI, Fiber Channel or eSATA devices, as well as IDE, Ethernet, FireWire, or USB. Further, the signal expanding component 14 is utilized for facilitate communication between large numbers of storage devices, such as Serial Attached SCSI (SAS), Serial ATA, PCI, or IDE storage drive. It is also been known as the "hard disk drive expander" to form part of a service delivery subsystem and facilitate communication between storage devices (i.e. data storage devices 32 or data storage group 30), and also to facilitate the connection of multiple SAS End devices to a single initiator port (i.e. data storage expanding module 12).

It is also well known in the art that a signal expanding component 14 is only able to connect limit number of storage devices. For instance, one hard disk drive expander in the current industry practice may be able to connect twenty-four storage devices. In order to effectively transmit the data signal sent from the terminal equipment 20 to the newly added data storage devices 32 when the number of the data storage group 30 is added, additional data storage expanding apparatus 10 must be simultaneously added, and the additional data storage expanding apparatus 10 is electrically connected to the newly added data storage devices 32 and the terminal equipment 20. A data storage expanding module 12 of the additional data storage expanding apparatus 10 is electrically connected to the terminal equipment 20, and a signal expanding component 14 of the additional data storage expanding apparatus 10 is electrically connected to the data storage expanding module 12 and the data storage group 30 having newly added data storage devices 32. According to the description mentioned above, a data storage expanding apparatus 12 and a signal expanding component 14 (namely a data storage expanding apparatus 10) must be added while a data storage group 30 is added. The new added data storage expanding module 12 and the signal expanding component 14 for new the added data storage group 30 are then electrically connected to the original data storage expanding modules 12 and the signal expanding components 14 of original data storage groups 30 in parallel. After that, the operating data signal back or forth from the terminal equipment 20 can be transmitted to/between the particular data storage device 32 of additional data storage group 30. As mentioned, the capacity for signal expanding component 14 to connect the data storage devices 32 is limited. While there are more data storage devices 32 than a data storage expanding apparatus 10 could afford, an additional data storage expanding apparatus 10 has to be added into the system to absorb extra capacity of data storage devices 32. Further, the cost for a data storage expanding module 12 is much higher than a signal expanding component 14. In the current practice of structure of data storage expanding apparatus 10, one signal expanding component 14 is corresponding to one the data storage expanding module 12. The increasing number of data storage expanding apparatus 10 inevitable increases the number of the data storage expanding module 12. As such, how to reduce the number of the data storage expanding module 12 (which reduce the total cost of data storage expanding apparatus 10) and, in the meanwhile, remaining same high-speed performance become a critical issue in the related art.

SUMMARY OF THE INVENTION

It is an object to provide a data storage expanding apparatus having advantages of less devices involved and lower cost.

Accordingly, the data storage expanding apparatus according to one aspect of the present invention is electrically coupled to a terminal equipment and a plurality of data storage groups, and each data storage group comprises a plurality of data storage devices. The data storage expanding apparatus configured to transmit an operating data signal between the terminal equipment and a particular data storage device. The data storage expanding apparatus comprises a data storage expanding module and a plurality of signal expanding modules. The data storage expanding module is electrically coupled to the terminal equipment for hosting or controlling between the terminal equipment and the data storage devices. The signal expanding modules, for facilitating the communication between the data storage expanding module and the data storage devices, are electrically coupled in series, and to the data storage groups, respectively; and one of the signal expanding modules is electrically coupled to the data storage expanding module. The operating data signal is transmitted back and forth to the signal expanding module via the data storage expanding module electrically connected to the signal expanding module, and then the transmitted to particular data storage device via the signal expanding module.

The signal expanding module further comprises a master signal expanding component and a plurality of slave signal expanding components. The slave signal expanding components is electrically coupled to the master signal expanding component and the data storage devices, for facilitating and transmitting the operating data signal between the master signal expanding component and the data storage devices. The master signal expanding component is electrically coupled to the data storage expanding module and the slave signal expanding components, for gathering and transmitting the operating data signal between the data storage expanding module and the slave signal expanding components. The slave signal expanding components are electrically connected in parallel.

The data storage expanding apparatus further comprises a first signal expanding module and a second signal expanding module. The first signal expanding module further comprises a first master signal expanding component and the second signal expanding module further comprises a second master signal expanding component. The first master signal expanding component is electrically coupled to the second master signal expanding component. The data storage expanding module could be implemented by a host controller, host adapter, or host bus adapter (HBA); and the signal expanding module could be implemented by a hard disk drive expander.

It is another object to provide a computer system having advantages of less devices involved and lower cost. The computer system comprises a terminal equipment, a data storage expanding apparatus, and a plurality of data storage groups. The data storage expanding apparatus comprises a data storage expanding module and a plurality of signal expanding modules. The data storage expanding module is electrically coupled to the terminal equipment, for hosting or controlling communication between the terminal equipment and the data devices. The signal expanding modules, for facilitating the communication between the data expanding module and the data storage devices, electrically coupled in series, and to the data storage groups; and one of the signal expanding modules electrically coupled to the data storage expanding module. The data storage groups are electrically coupled to the signal expanding modules.

The signal expanding module further comprises a master signal expanding component and a plurality of slave signal expanding components. The slave signal expanding components is electrically coupled to the master signal expanding component and the data storage devices, for facilitating and transmitting the operating data signal between the master signal expanding component and the data storage devices. The master signal expanding component is electrically coupled to the data storage expanding module and the slave signal expanding components, for gathering and transmitting the operating data signal between the data storage expanding module and the slave signal expanding components. The slave signal expanding components are electrically connected in parallel.

The data storage expanding apparatus further comprises a first signal expanding module and a second signal expanding module. The first signal expanding module further comprises a first master signal expanding component and the second signal expanding module further comprises a second master signal expanding component. The first master signal expanding component is electrically coupled to the second master signal expanding component.

The data storage expanding module could be implemented by a host controller, host adapter, or host bus adapter (HBA); and the signal expanding module could be implemented by a hard disk drive expander.

Thereby, without increasing the number of the data storage expanding module, the data storage expanding apparatus increases the amount of the data storage group by increasing the amount of the signal expanding module, which has advantages of low cost and small volume.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
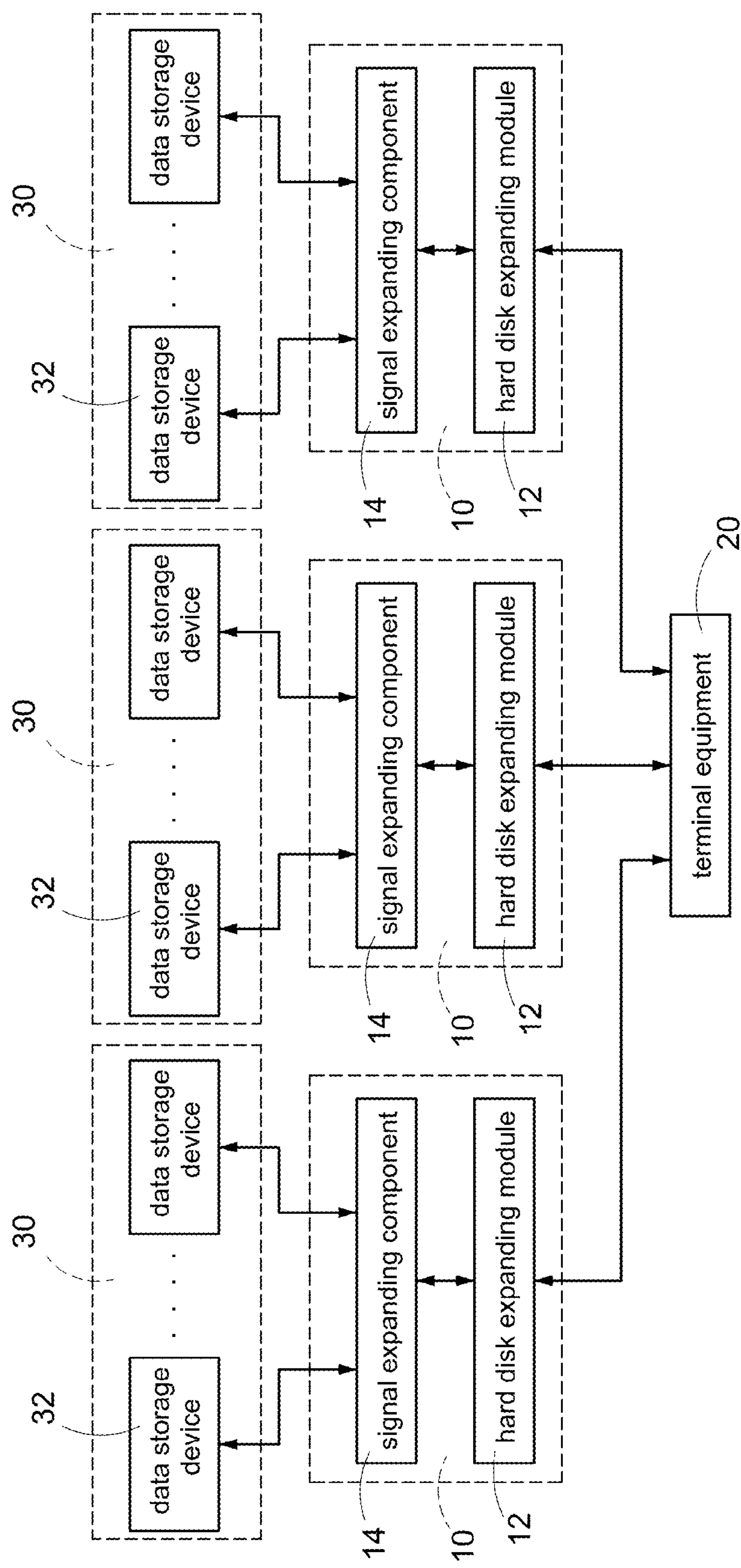
FIG. 1 is a block diagram of a conventional data storage expanding apparatus.
Figure 2:
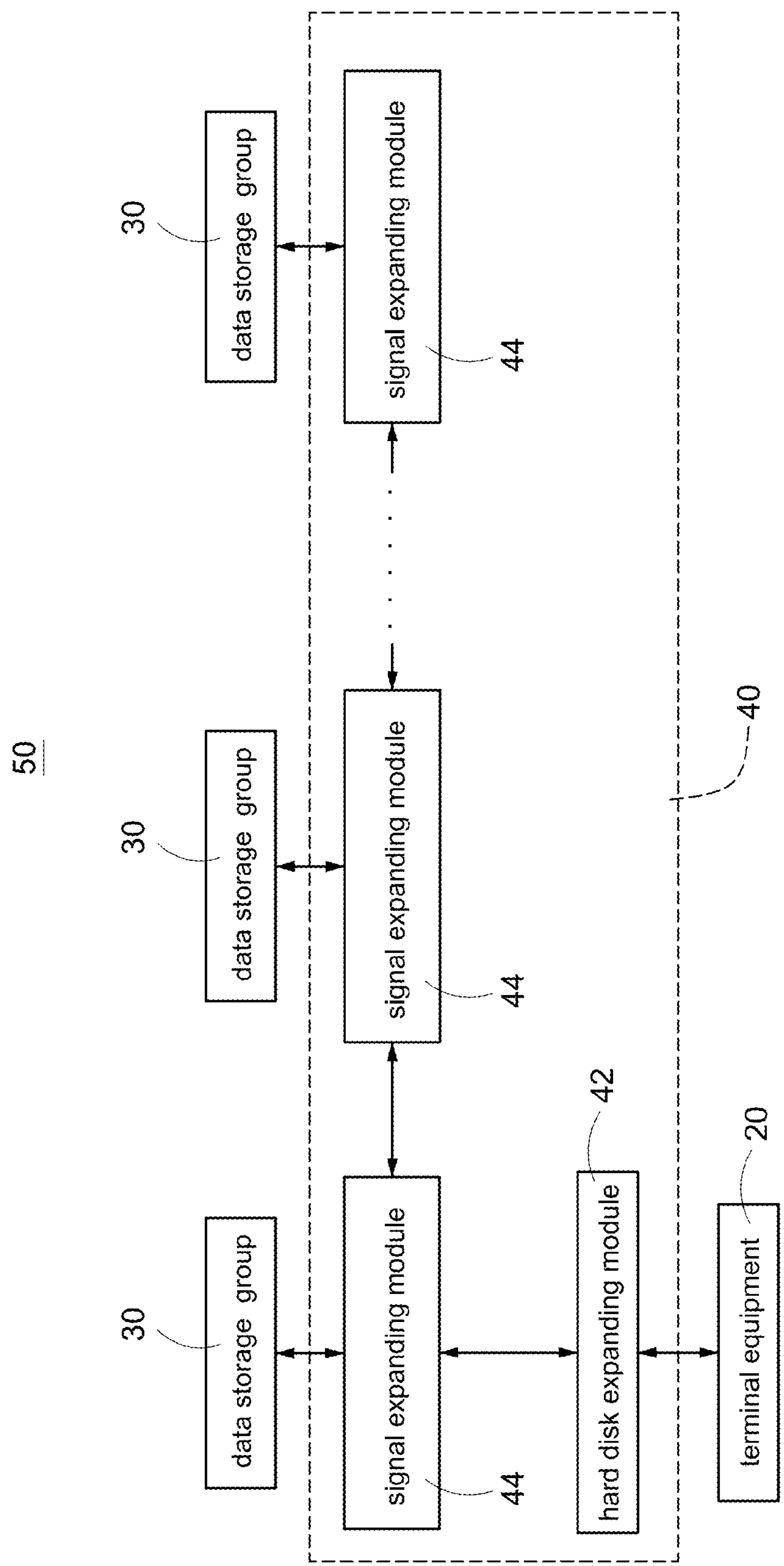
FIG. 2 is a block diagram of a computer system according to the present invention.
Figure 3:
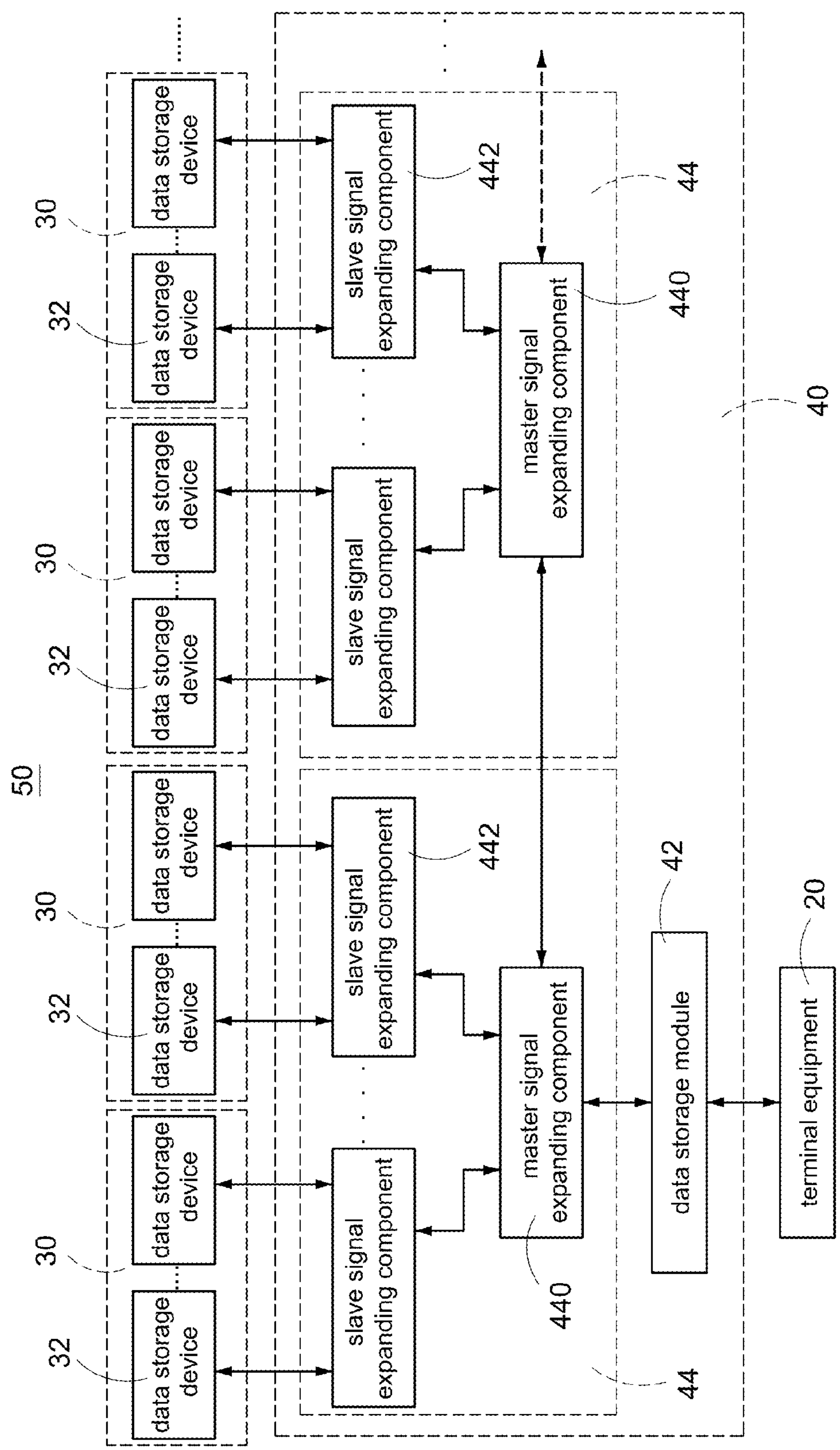
FIG. 3 is another block diagram of a computer system according to the present invention.

Reference is made to FIG. 2 and FIG. 3, which are block diagrams of computer systems according to the present invention. The computer system 50 includes a terminal equipment 20, a plurality of data storage groups 30, and a data storage expanding apparatus 40. The data storage expanding apparatus 40 is configured to connect to the terminal equipment 20 and the data storage expanding apparatus 30. Each data storage group 30 includes a plurality of data storage devices 32, and each data storage device 32 could be implemented, for example, by a data storage device with series advanced technology attachment (SATA) interface, solid state device (SSD), a data storage device with series attached small computer system interface (SAS), or a hard disk drive (HDD). The terminal equipment 20 could be referred to, for example, a server or computer system. The data storage expanding apparatus device 40 is, for example, inserted into a slot formed on a mother board (not shown) and configured to transmit an operating data signal sent back and forth from the terminal equipment 20 to at least one data storage device 32.

The data storage expanding apparatus 40 includes a data storage expanding module 42 and a plurality of signal expanding modules 44 (as shown in FIG. 2). The data storage expanding module 42 is electrically connected to the terminal equipment 20 and configured to receive the operating data signal back and forth from the terminal equipment 20. The signal expanding module 44 is electrically connected to the data storage expanding apparatus 42, the data storage group 30, and other signal expanding module 44. The operating data signal back or forth from the terminal equipment 20 can be transmitted to the data storage groups 30. In this embodiment, the data storage expanding module 42 could be implemented by, for example, a host bus adapter (HBA) with 8 pins. However, in the practical applications, the data storage expanding module 42 can be any host controller, host adapter, or HBA for the purpose of connecting a host system (e.g. the terminal equipment 20).

Each signal expanding modules 44 is used as signal transmitting channel. The signal expanding modules 44 are electrically connected in series, and one of the signal expanding modules 44 is electrically connected to the data storage expanding module 42, and each signal expanding module 44 is electrically connected to one data storage module 30. Comparing with prior art, the signal expanding modules 44 shares some channels for parallel transmission with other signal expanding modules 44. In such structure, one data storage expanding module 42 is able to connect and communicate with multiple signal expanding modules 44 (and its respective data storage groups 30), so as to reduce the number of data storage expanding modules 42 installed herein.

Please refer to FIG. 3 for another embodiment of this invention. The signal expanding module 44 further includes a master signal expanding component 440 and a plurality of slave signal expanding components 442 electrically connected to the master signal expanding component 440 in series, respectively. The master signal expanding component 440 is electrically connected to the data storage expanding module 42. In this embodiment, the master signal expanding component 440 and the slave signal expanding components 442 could be implemented by a host bus adapter ("HBA") having 36 pins. In the practical application, the master signal expanding component 440 and the data storage expanding component 42 are electrically connected to each other via cable (not shown) cross between.

It should be note that the master signal expanding component 440 and the slave signal expanding components 442 are used for expanding channels of the operating data signal such that there are more data storage devices 32 can receive corresponding operating data signal. In particularly, the master signal expanding components 440 and the slave signal expanding components 442 are signal expanding components with same specification.

Each master signal expanding component 440 is electrically connected to multiple slave signal expanding component 442, and each slave signal expanding component 442 is electrically connected to multiple data storage group 30. In particularly, the main signal expanding component 440 and the slave signal expanding component 442 are simultaneously placed on a printed circuit board (not shown) and electrically connected to traces formed thereon.

In operation, the operating data signal is transmitted between the terminal equipment 20 and the particular data storage device 32. In particularly, the data storage expanding module 42 receives the operating data signal and determines the position of particular data storage device 32, and then transmits the operating data signal to the master signal expanding component 440. The master signal expanding component 440 receives the operating data signal and transmits the operating data signal to the slave signal expanding component 442 electrically connected to the particular data storage device 32. The slave signal expanding component 442 then interacts with the particular data storage device 32 according to the operating data signal and achieves the assigned actions of data storage or data reading.

In sum, the data storage expanding apparatus 40 according to the present invention uses a plurality of master signal expanding components 440 electrically connected in series let the operating data signal back and forth from the terminal equipment 20 and particular data storage device 32. Comparing to the conventional data storage expanding apparatus 10 which requires multiple data storage expanding apparatus 10 to achieve data storage or data reading of multiple data storage groups, the data storage expanding apparatus 40 of the present invention proposes to increase the number of signal expanding modules 44 to expand number of the data storage groups 30 without increasing data storage expanding module 42. Therefore, the data storage expanding apparatus 40 stated herein has advantages of high expansion and low cost.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A data storage expanding apparatus electrically coupled to a terminal equipment and a plurality of data storage groups, each data storage group comprising a plurality of data storage devices, the data storage expanding apparatus configured to transmit an operating data signal between the terminal equipment and a particular data storage device, the data storage expanding apparatus comprising:

a data storage expanding module, electrically coupled to the terminal equipment, for hosting or controlling communication between the terminal equipment and the data storage devices; and a plurality of signal expanding modules, for facilitating the communication between the data storage expanding module and the data storage devices, electrically coupled in series, and to the data storage groups, respectively; and one of the signal expanding modules electrically coupled to the data storage expanding module;

wherein the operating data signal is transmitted to the signal expanding module via the data storage expanding module electrically connected to the signal expanding module, and then transmitted to particular data storage device via the signal expanding module;

wherein each signal expanding module comprises a master signal expanding component and a plurality of slave signal expanding components; the slave signal expanding components are coupled to the master signal expanding component and the data storage devices for facilitating and transmitting the operating data signal between the master signal expanding component and the data storage devices; and wherein the master signal expanding components are electrically connected in series, and only one of the master signal expanding components is coupled to the data storage expanding module and the slave signal expanding components, for gathering and transmitting the operating data signal between the data storage expanding module, the slave signal expanding components, and the other master signal expanding components.

2. The data storage expanding apparatus in claim 1, wherein the data storage expanding apparatus further comprises a first signal expanding module and a second signal expanding module; the first signal expanding module further comprises a first master signal expanding component and the second signal expanding module further comprises a second master signal expanding component; and the first master signal expanding component is electrically coupled to the second master signal expanding component.

3. The data storage expanding apparatus in claim 2, wherein the slave signal expanding components are electrically connected in parallel.

4. The data storage expanding apparatus in claim 1, wherein the data storage expanding module is implemented by a host controller, host adapter, or host bus adapter (HBA); and the signal expanding module is implemented by a hard disk drive expander.

5. A computer system comprising:

a terminal equipment;

a data storage expanding apparatus comprising:

a data storage expanding module electrically coupled to the terminal equipment, for hosting or controlling communication between the terminal equipment and the data devices; and a plurality of signal expanding modules, for facilitating the communication between the data expanding module and the data storage devices, electrically coupled in series, and to the data storage groups; and one of the signal expanding modules electrically coupled to the data storage expanding module; and a plurality of data storage groups electrically coupled to the signal expanding modules, wherein each signal expanding module comprises a master signal expanding component and a plurality of slave signal expanding components; the slave signal expanding components are coupled to the master signal expanding component and the data storage devices for facilitating and transmitting the operating data signal between the master signal expanding component and the data storage devices; and wherein the master signal expanding components are electrically connected in series, and only one of the master signal expanding components is coupled to the data storage expanding module and the slave signal expanding components, for gathering and transmitting the operating data signal between the data storage expanding module, the slave signal expanding components, and the other master signal expanding components.

6. The computer system in claim 5, the data storage expanding apparatus further comprises a first signal expanding module and a second signal expanding module; the first signal expanding module further comprises a first master signal expanding component and the second signal expanding module further comprises a second master signal expanding component; and the first master signal expanding component is electrically coupled to the second master signal expanding component.

7. The computer system in claim 6, wherein the slave signal expanding component are electrically connected in parallel.

8. The computer system in claim 5, wherein the data storage expanding module is implemented by a host controller, host adapter, or host bus adapter (HBA); and the signal expanding module is implemented by a hard disk drive expander.

* * * * *